Aug. 27, 1940.    P. ESCHERT ET AL    2,213,134
TREE PROTECTOR
Filed Aug. 17, 1937
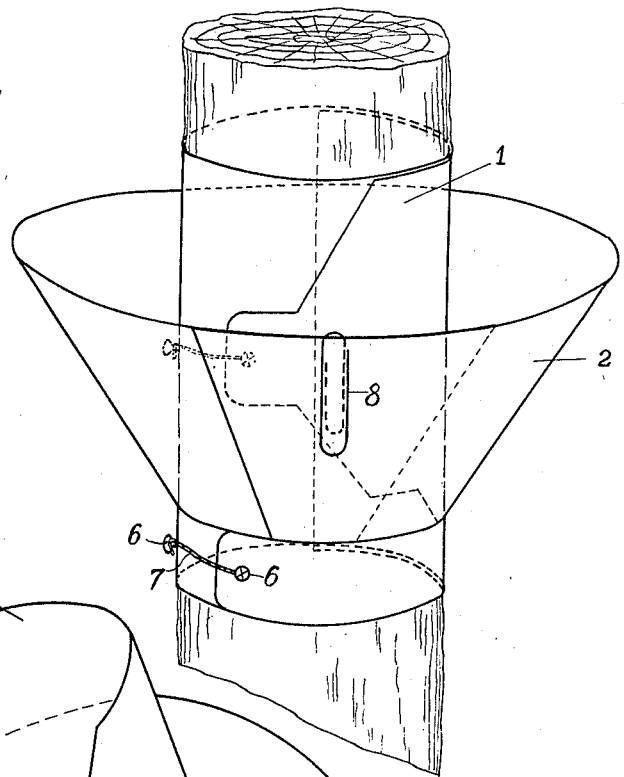
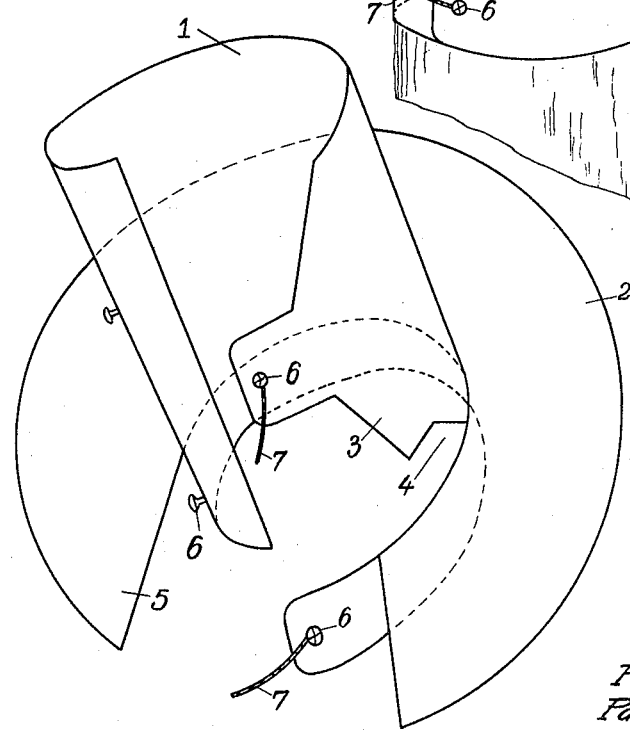
Inventor:
Paul Eschert,
Paul Kirchhoff,
Attorneys Patented Aug. 27, 1940

2,213,134

UNITED STATES PATENT OFFICE 2,213,134

TREE PROTECTOR

Paul Eschert and Paul Kirchhoff, Berlin, Germany

Application August 17, 1937, Serial No. 159,609
In Germany October 8, 1936

1 Claim. (Cl. 47—24)

This invention relates to a device for protecting trees from injurious insects, and has for its object to improve the construction and increase the efficiency and utility of devices of this character.

Another object of the invention is to produce a tree protector forming a single unit which can be applied without any auxiliary means in the simplest manner, and which is adapted to be used for trees of various sizes.

In the accompanying drawing, forming a part of the specification, a preferred form of the embodiment of the invention is illustrated by way of example.

Fig. 1 is a perspective view of the device as applied to a tree, and

Fig. 2 is a perspective view of the device detached.

The tree protector consists of an inner tubular sheet portion 1 and of a conical strip portion 2 with its larger end upward. Both said portions are made of a material impervious to water such as rubber, leather, or impregnated paper or textile fabric, and the portion 2 is fastened by its lower smaller end to the portion 1 in a water-tight manner. Further, both said portions are divided longitudinally and their respective ends overlap one another.

The inner tubular portion 1 extends below the lower end of the conical portion 2, and the overlapping part 3 of the inner tubular portion 1 is provided with a slot 4 extending substantially horizontally from the overlappng edge of the part 3 along a part of the lower end of the conical portion 2. Thus, when applied to a small tree, the overlapping part 5 of the conical portion 2 can slide into the slot 4 so that the same device can be used for trees of various sizes.

The upper and preferably also the lower part of the inner tubular portion 1 is provided with buttons 6 so as to make it possible to fasten the device to the tree by means of a wire or string 7 to be wound around the bottons. The wire or string can be fixed with one end to one part of the tubular portion or to one of the buttons so as to have it ready at hand.

Before applying the device to the tree the larger unevennesses of the bark are smoothened and then the device is attached to the tree by lacing the tubular portion so tightly around the tree as to prevent any insect from crawling up between the said tubular portion and the bark. The overlapping parts of the conical portion may be secured to one another by a simple letter-clip as indicated at 8, and the annular trough formed by the said conical portion 2 is filled with water or another liquid. If the insects crawl up the tubular portion, they are met by the outwardly inclined conical portion which prevents many insects from going on upwards. Others might climb the conical portion but then they are certainly turned back or killed by the liquid in the trough. Any insects that try to pass from the tree downwards are trapped in the same manner within the conical portion.

What we claim is:

An adjustable tree-protector comprising a sheet of flexible, waterproof material, lower and upper adjustable fastening means for securing one vertical edge of said sheet over the other whereby tightly to engage around a tree, a strip of waterproof material having its lower edge shorter than its upper edge, the said lower edge being secured along its length to said sheet immediately above said lower fastening means, whereby, when said sheet is wrapped around said tree, said strip forms a frustro-conical trough therearound with one end overlapping the other, said sheet having a slot extending substantially horizontally from the overlapping edge thereof for accommodating the overlapped end of said strip.

PAUL KIRCHHOFF.
PAUL ESCHERT.